United States Patent [19]

Ochi et al.

[11] Patent Number: 5,076,979

[45] Date of Patent: * Dec. 31, 1991

[54] PROCESS FOR PRODUCTION OF VARISTOR MATERIAL

[75] Inventors: Hideo Ochi; Akihide Igari, both of Tokyo; Zenbee Nakagawa, Kanagawa, all of Japan

[73] Assignee: Somar Corporation, Tokyo, Japan

[ * ] Notice: The portion of the term of this patent subsequent to Dec. 17, 2008 has been disclaimed.

[21] Appl. No.: 365,993

[22] Filed: Jun. 14, 1989

[30] Foreign Application Priority Data

Jun. 15, 1988 [JP] Japan ............................... 63-147307

[51] Int. Cl.[5] ......................... C04B 33/34; H01B 1/06

[52] U.S. Cl. ..................................... 264/61; 252/518; 264/66; 419/23; 419/38; 419/53

[58] Field of Search .................... 264/61, 66; 252/518; 423/593, 599, 622; 338/20, 22; 419/23, 33, 38, 53, 54

[56] References Cited

U.S. PATENT DOCUMENTS 5,039,452 8/1991 Thompson et al. ................. 252/518
5,039,971 8/1991 Imai et al. ............................ 338/20

FOREIGN PATENT DOCUMENTS 2651274 5/1977 Fed. Rep. of Germany .

OTHER PUBLICATIONS

Chemical Abstracts, vol. 85, No. 12 (9/20/76), p. 571, Abstract No. 86214n, Columbus, Ohio.
Chemical Abstracts, vol. 84, No. 12, (3/22/76), p. 655, Abstract No. 83245s, Columbus, Ohio.

*Primary Examiner*—Josephine Barr
*Attorney, Agent, or Firm*—Sughrue, Mion, Zinn Macpeak & Seas

[57] ABSTRACT

A process for the production of a varistor material having a nonlinear index ($\alpha$) of at least 20, which comprises adding a manganese compound to zinc oxide; heating the obtained mixture in the form of a powder in the atomosphere at 1050° to 1150° C.; grinding the material to give a particle size of 150 mesh or below; molding the powder into a desired shape; and sintering the same at 1200° to 1350° C.; is disclosed.

2 Claims, No Drawings

PROCESS FOR PRODUCTION OF VARISTOR MATERIAL

FIELD OF THE INVENTION

This invention relates to a process for the production of a varistor material comprising zinc oxide as a base.

BACKGROUND OF THE INVENTION

It is widely known that the electric resistance of a sintered zinc oxide would considerably vary depending on electric voltage, Such a material has been widely applied to the stabilization of electric voltage or to the absorption of surge voltage by taking advantage of the nonlinear relationship between its voltage and current. These electric nonlinear elements are called varistors. The quantative relationship between the electric current and voltage of a varistor is approximately represented by the following equation (1).

$$I=(V/C)^{\alpha} \quad (1)$$

wherein V represents an electric voltage applied to the varistor; I represents an electric current passing therethrough; C is a constant; and $\alpha$ is an index larger than 1.

In this case, $\alpha$ is called a nonlinear index which indicates the degree of the nonlinearity. Generally speaking, the larger u value is the more preferable. $\alpha$ is calculated according to the following equation (2).

$$\alpha=\log(I_2/I_1)/\log(V_2/V_1) \quad (2)$$

wherein $V_1$ and $V_2$ each represent the electric voltage at given current $I_1$ and $I_2$.

In a common case, $I_1$ and $I_2$ are determined a 1 mA and 10 mA, respectively, and $V_1$ is called the varistor voltage. C and $\alpha$ vary depending on the formulation and production method of the varistor. These facts have already been well known in the art.

A zinc oxide varistor may be usually produced by the following method.

Namely, additives are mixed with zinc oxide and dried. The obtained dried matter is molded into a desired shape by a common molding method employed for ceramics and subsquently sintered at an appropriate temperature. During this sintering stage, required reactions would occur among the zinc oxide and additives. Thus the mixture is molten and sintered to thereby give the aimed varistor material. Subsequently the obtained varistor material is provided with electrodes and a conductor. Thus an element is formed.

Although several theories have been reported relating to the mechanisms of the expression of the varistor properties of sintered zinc oxide materials, no definite one has been established so far. However it is recognized that the electric properties of a varistor originate from its microstructure. A zinc oxide varistor generally comprises zinc oxide particles around which a highly resistant boundary layer is located and bound thereto. Additives are employed in order to form this boundary layer. Several or more additives are generally used and the types and amounts thereof may vary depending on the aimed properties.

Conventional methods for the production of a zinc oxide varistor material suffer from a serious problem. That is to say, the properties of a sintered material would widely vary, which makes it impossible to efficiently produce varistor materials of constant properties. This problem might be caused by the fact that there are a number of additives to be used and these additives complicatedly and delicately react with zinc oxide as well as with each other upon firing. Therefore, these reactions are considerably affected by a change in the production conditions. Thus, it is highly difficult to uniformly control the microstructure of the sintered material and the microdistribution of chemical components thereof at a high reproducibility.

Furthermore, additives which are liable to be evaporated at a high temperature such as bismuth oxide are frequently employed in the prior art, which makes the control of the microstructure of the sintered material and microdistribution of chemical components thereof more difficult.

SUMMARY OF THE INVENTION

In order to overcome the abovementioned problems observed in conventional zinc oxide varistor materials, the inventors of the present invention have examined various additives. As a result, the inventors of the present invention have found that a varistor material having a high nonlinear index ($\alpha$) can be obtained by using zinc oxide, i.e., the main component, together with only one additive (a manganese compound), mixing said components, sintering the obtained mixture and annealing the sintered material. The inventors of the present invention have already filed this process (Japanese Patent Application No. 36170/88). The inventors of the present invention subsequent studies have further made it possible to readily produce a varistor material having an elevated nonlinear index ($\alpha$) from the same starting materials. Accordingly, it is the object of the present invention to provide a process for readily producing a varistor material having a simple composition and a remarkably elevated nonlinear index ($\alpha$).

The present invention provides a process for the production of a varistor material having a nonlinear index ($\alpha$) of at least 20, which comprises mixing a manganese compound with zinc oxide, heating the obtained mixture in the form of a powder in the atmosphere at 1050° to 1150° C., grinding the obtained material to thereby give a particle size of 150 mesh or below, preferably 200 mesh or below, molding the same into a desired shape and sintering the molded product at 1200° to 1350° C.

DETAILED DESCRIPTION OF THE INVENTION

In the process of the present invention, zinc oxide and a manganese compound are homogeneously mixed together. The obtained mixture, which is in the form of a powder, is then heated as such in the atmosphere at 1050° to 1150° C. Next, the heated material is ground to thereby control the particle size. A binder may be added thereto, if required. Examples of the binder include a synthetic polymer (e.g., polyvinyl alcohol, polyvinyl butyral, polyoxymethylene), various waxes, rosin, liquid paraffin, glycerine, water, and the like, which can be generally used in a ceramics molding process. It is not preferred, however, to use the one which contains an element other than carbon, oxygen, hydrogen, and nitrogen atom, as consisting elements because it may impart unpredictable influences on the varistor property. Then it is molded followed by sintering in the atmosphere at 1200° to 1350° C. to thereby give the aimed varistor material. Either manganese oxide or any other manganese compound may be used in this process so long as it can be converted into manganese oxide by firing. Examples thereof include inorganic salts of manganese such as manganese nitrate or halides, organic salts thereof such as manganese acetate, propionate, benzoate, acetylacetate, n-butyrate, 4-cyclohexylbutyrate, naphthenate, or 2-ethylhexane and manganese hydroxide. The use of manganese nitrate is preferred.

In a preferred embodiment of the present invention, zinc oxide and a manganaese compound are dissolved in a solvent and then mixed together as such. The mixing may be carried out by, for example, mixing a solution of the manganese compound with zinc oxide; or mixing zinc oxide with the manganese compound in the presence of a solvent in which the manganese compound is soluble. Examples of the solvent to be used in the latter case include water, organic solvents and mixtures thereof. Examples of the organic solvents include alcohols such as methanol and ethanol. Any solvent may be used therefor so long as it exerts no direct effect on the zinc oxide and can be removed by evaporating after the completion of the mixing. Since the manganese compound is mixed with the zinc oxide in a dissolved form upon this mixing, the manganese compound can be homogeneously carried by zinc oxide particles at a molecular level.

The mixture thus obtained is dried and the solvent is removed by evaporation. Then it is ground and heated in the form of a powder. The heat treatment may be conducted at a temperature of 1050° to 1150° C., preferably 1080° to 1120° C. for 0.5 to 3 hours, preferably 1 to 2 hours. When the heat treatment temperature is lower than 1050° C., a sufficiently elevated nonlinear index ($\alpha$) can not be achieved. When the heat treatment time is lower than 0.5 hours, a sufficient effect cannot be obtained. When the heat treatment is over 3 hours, the heat treatment is overproceeded to adjust particle sizes in the subsequent step. Heat treatment of a powdery starting mixture is generally conducted in the sintering of ceramics in order to give a uniform sintered material. This heat treatment is called calcination in the art. In a conventional method for producing a zinc oxide varistor, the calcination is generally conducted at 700° to 900° C. However such an elevated nonlinear index as the one achieved by the present invention can never be obtained thereby. The heat treatment in the process of the present invention is essential in order to achieve the elevated varistor properties. It is assumed that some important reaction for directly achieving the varistor properties would be promoted during this heat treatment stage. Therefore the heat treatment conducted in the process of the present invention obviously differs from the calcination commonly used in the art.

It is needless to say that a provisional calcination step at 700° to 900° C. may be introduced prior to the heat treatment in the process of the present invention. When the heat treatment in the process of the present invention is conducted at a temperature exceeding 1150° C., the solidification of the powder caused by the sintering would proceed to an undesirable extent, which makes it difficult to finely grind the calcined material in the subsequent grinding step. Thus it is difficult in this case to give a dense molded matter.

The subsequent sintering may be conducted at 1200° to 1350° C., preferably 1200° to 1300° C. When the sintering temperature is lower than 1200° C., a sufficiently elevated nonlinear index ($\alpha$) can not be obtained in practice. When it exceeds 1350° C., on the other hand, the sintering density would rather be unpreferably lowered. The sintering can be completed it in 0.5 to 1 hour. For stabilization of the property, it is preferred to complete in 0.5 to 1.5 hours.

It is preferable in the present invention to carry out the heat treatment at approximately 1100° C. and the sintering at approximately 1300° C.

The varistor material obtained according to the process of the present invention may be thermally treated again at 1050° to 1150° C. This thermal treatment is called annealing in the art. The nonlinear index ($\alpha$) may be further elevated by conducting the annealing at 1050° to 1150° C., preferably 1080° to 1120° C.

In the present invention, the mixing of zinc oxide with a manganese compound may be preferably conducted by maintaining the manganese compound in a dissolved state by using a solvent, as described above. It is needless to say, however, either a soluble or insoluble manganese compound may be mixed with zinc oxide by a physical or mechanical procedure conventionally employed in the art.

In the process of the present invention, the manganese compound may be added to the zinc oxide in an amount of 3 to 7% by mol, on a molar basis of MnO, per 100% by mol of ZnO+MnO. When the ratio of the manganese compound does not fall within this range, it becomes difficult to obtain a nonlinear index ($\alpha$) of at least 20.

As described above, a practically available varistor material may be formed by the process of the present invention by utilizing a manganese compound alone as an additive to be added to zinc oxide. However other additives (such as a compound, e.g., of cobalt, lead, chromium, praseodymium, bismuth, boric acid, nickel or, aluminum) may be used in the present invention, so long as the achievement of the objects of the present invention is not inhibited thereby.

According to the present invention, a varistor material can be readily produced by adding only one additive (manganese) to zinc oxide. In addition, the varistor material obtained thereby has an extremely high nonlinear index ($\alpha$).

To further illustrate the present invention, the following non-limiting examples will be given.

EXAMPLE

A definate amount of manganese nitrate ($Mn(NO_3)_2.6H_2O$) was added to zinc oxide in ethanol. After thoroughly mixing, the solvent was removed by evaporation to dry the mixture. The residue in the form of a powder was heated as such at 700° to 1100° C. for 1 to 8 hours.

Next, the heated sample was ground to give a particle size of 150 mesh or below and preliminarily molded into a disc of 10 mm in diameter and 2 mm in thickness under 300 kg/cm$^2$. Then it was further molded under a hydrostatic pressure of 1 t/cm$^2$. The molded material thus obtained was placed in an electric resistance heating oven and heated in the atmosphere at a rate of 6° C./min. When the temperature reached 1300° C., the material was calcined by maintaining at this temperature for 1 hour. Then it was allowed to cool in the oven.

Both surfaces of the sintered material thus obtained were smoothed and an indium/mercury amalgam was applied thereon to thereby give electrodes. Then the electric current/voltage properties thereof were determined by the DC two-terminal method.

As a result, samples containing 5% by mol (in terms of MnO, the same will apply hereinafter) of the manganese compound and heated at 1100° C. showed remarkable varistor properties. Table 1 shows the results.

TABLE 1

| Heat Treatment | | | |
|---|---|---|---|
| Temp. (°C.) | Time (hr) | Nonlinear index (α) | Remarks |
| 700 | 1 | 6.1 | Comparison |
| 800 | 1 | 2.4 | Comparison |
| 900 | 1 | 1.2 | Comparison |
| 900 | 8 | 3.5 | Comparison |
| 1000 | 1 | 4.5 | Comparison |
| 1100 | 1 | 20.0 | Invention |
| 1100 | 2 | 32.8 | Invention |

Next, the relationship between the amount of the manganese compound and the nonlinear index by heating at 1100° C. for 2 hours and then sintering at 1300° C. was observed. As a result, remarkable varistor properties were observed when 3 to 7% by mol of the manganese compound was added. It was further found that the varistor properties were elevated by annealing the sintered materials containing 3 to 5% by mol of MnO.

Table 2 shows the results.

TABLE 2

| MnO | Nonlinear index (α) | |
|---|---|---|
| (% by mol) | sintered | Annealed |
| 3 | 24.9 | 32.0 |
| 4 | 35.8 | 38.3 |
| 5 | 32.8 | 35.8 |
| 6 | 48.6 | 44.6 |
| 7 | 34.0 | 25.3 |

While the invention has been described in detail and with reference to specific embodiments thereof, it will be apparent to one skilled in the art that various changes and modifications can be made therein without departing from the spirit and scope thereof.

What is claimed is:

1. A process for production of a varistor material having a nonlinear index (α) of at least 20, which comprises adding a manganese compound to zinc oxide; heating the obtained mixture in the form of a powder in the atmosphere at 1050° to 1150° C.; grinding the material to give a particle size of 150 mesh or below; molding the powder into a desired shape; and sintering the same at 1200° to 1350° C.

2. A process as set forth in claim 1, wherein said manganese compound is added to said zinc oxide in an amount of 3 to 7% by mol, in terms of MnO, based on 100% by mol of ZnO and MnO.

* * * * *